(12) United States Patent
Boedecker

(10) Patent No.: US 8,382,964 B1
(45) Date of Patent: Feb. 26, 2013

(54) SOLAR-POWERED POOL SKIMMER LID

(76) Inventor: Kevin Boedecker, Granite Bay, CA (US)

( * ) Notice: Subject to any disclaimer, the term of this patent is extended or adjusted under 35 U.S.C. 154(b) by 224 days.

(21) Appl. No.: 12/435,815

(22) Filed: May 5, 2009

Related U.S. Application Data

(60) Provisional application No. 61/078,215, filed on Jul. 3, 2008.

(51) Int. Cl.
*H01L 25/00* (2006.01)
*B23H 3/02* (2006.01)
*C25B 9/00* (2006.01)

(52) U.S. Cl. ........ 204/228; 204/149; 204/242; 204/267; 204/271; 204/279; 204/196.2; 136/252; 136/243

(58) Field of Classification Search ............ 136/252, 136/243; 204/242, 271, 267, 277, 278, 279, 204/196.2, 228, 149
See application file for complete search history.

(56) References Cited

U.S. PATENT DOCUMENTS

| | | | | |
|---|---|---|---|---|
| 4,752,401 A | * | 6/1988 | Bodenstein | 210/746 |
| 4,769,119 A | * | 9/1988 | Grundler | 210/748.18 |
| 4,900,432 A | * | 2/1990 | Arnold et al. | 210/91 |
| 5,059,296 A | * | 10/1991 | Sherman | 204/229.8 |
| 2005/0120473 A1 | * | 6/2005 | Southon et al. | 4/541.6 |
| 2007/0158176 A1 | * | 7/2007 | Briggs | 204/164 |

* cited by examiner

*Primary Examiner* — Jennifer Michener
*Assistant Examiner* — Marla D McConnell

(57) ABSTRACT

A solar-powered pool skimmer is disclosed. The solar-powered skimmer may include lid having an upper surface and a lower surface, and a solar cell affixed to the upper surface of the lid. A pair of electrodes is electrically affixed to the terminals of the solar cell, and is each capable of being stored in a retracted position and moved to an extended position.

4 Claims, 4 Drawing Sheets

US 8,382,964 B1

SOLAR-POWERED POOL SKIMMER LID

CROSS-REFERENCE TO RELATED APPLICATIONS

This application claims priority to U.S. provisional application 61/078,215, filed Jul. 3, 2008.

FIELD OF THE DISCLOSURE

The present disclosure relates generally a solar-power pool skimmer that is configured to retrofit into existing systems.

BACKGROUND

As most owners of outdoor swimming pools know, keeping the pool free of debris, such as leaves and the like can be an onerous job. If such floating debris is not removed from the pool, it often sinks and must be vacuumed from the pool before it has a chance to clog the filter system of the pool. Vacuuming a swimming pool is a difficult and burdensome task which most pool owners would rather be kept to a minimum.

For this reason, the art has included several proposals for skimmer devices that float on top of the water in a swimming pool and remove floating debris. While somewhat successful, these skimmer devices have several drawbacks. For example, some of these devices must be plugged into a source of electrical power. Not only can this be dangerous, it may also limit the area of the pool that can be covered by the skimmer. An electrical cord can also have a tendency to tangle thereby further limiting the area covered by the skimmer. Additionally, floating skimmers can be disrupted by swimmers, and are often removed to interfere with activity in the pool.

DETAILED DESCRIPTION

Figure 1:
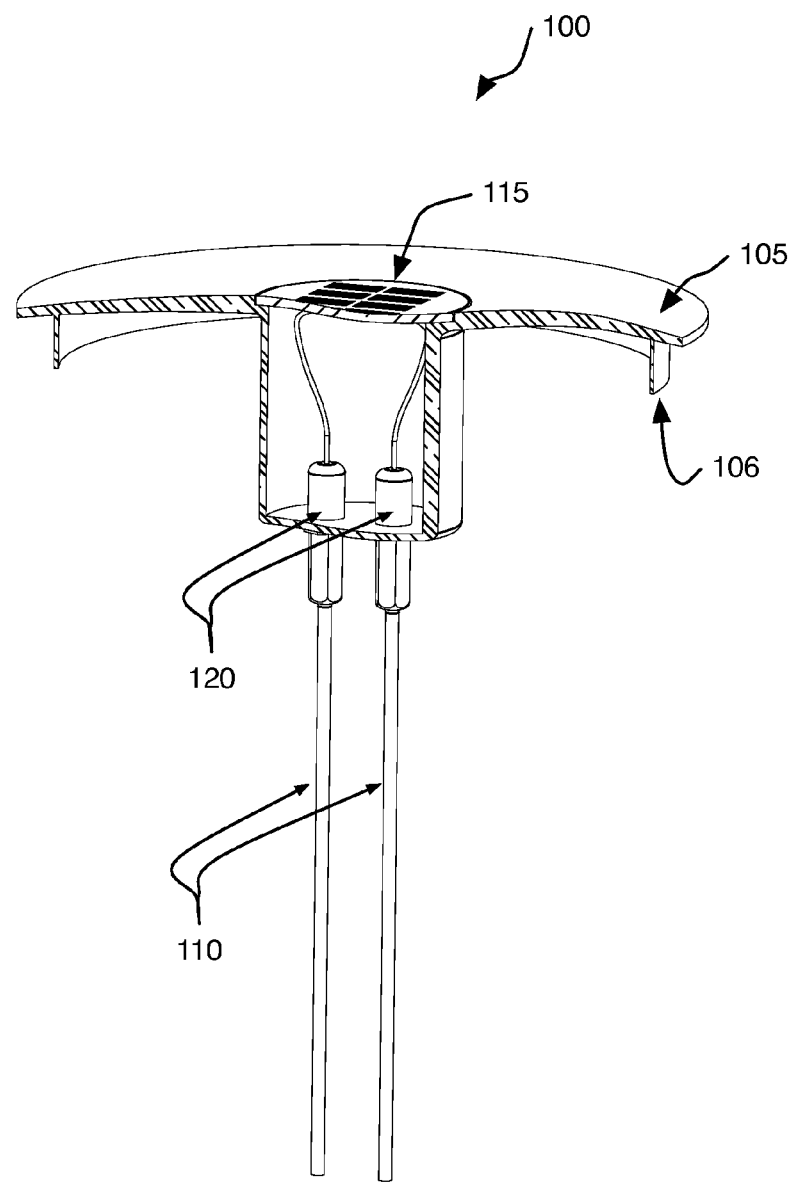
FIG. 1 is an oblique cut-away view showing one possible arrangement of a solar-powered skimmer lid in accordance with this disclosure.

FIG. 1 illustrates a solar-powered skimmer lid apparatus 100 in accordance with this disclosure. In a preferred embodiment, the apparatus 100 may include a lid 105. The lid 105 may be constructed from an unbreakable plastic. The apparatus 100 may also include a cylindrical sleeve 106 disposed about the bottom surface of the lid 105. It is preferred that the lid 105 and sleeve 106 be configured to replace a standard-size skimmer lid commonly found on pool skimmers, as will be shown in more detail below.

One or more solar cells 115 may be disposed about the top surface of lid 105. The solar cell 115 may comprise means for providing power to a pair of electrodes 110. The electrodes 110 may be arranged in a spaced-apart parallel fashion extending in a downward direction from the lid 105. The length of the electrodes 115 is preferably long enough to reach below the surface of the water into which the electrodes 115 are disposed, as will be seen in more detail below.

Battery means (not shown) may be provided to provide power to the electrodes 110 during periods when sunlight is not available.

In a preferred embodiment, the electrodes 110 may be constructed from a copper or copper/silver combination.

Figure 2:
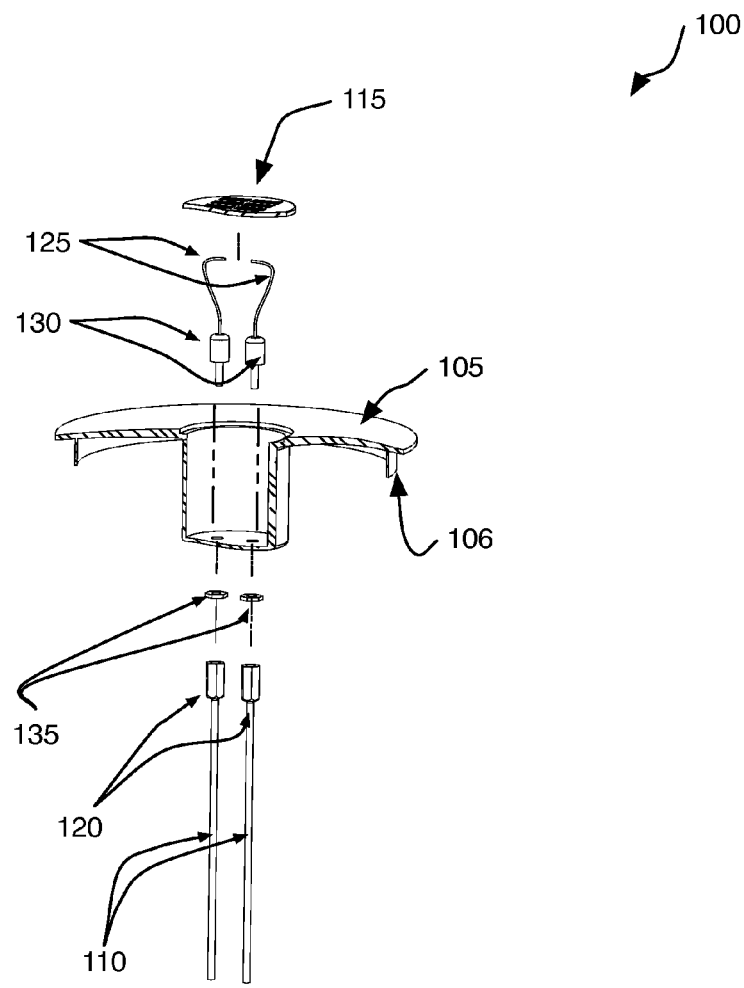
FIG. 2 is an exploded view showing one possible arrangement of a solar-powered skimmer lid in accordance with this disclosure.

Referring now to FIG. 2, an exploded view of the solar-power skimmer lid is shown. It is contemplated that electrodes may be removably attached to the bottom of the lid 105 using male and female threaded fasteners 130 and 120, respectively, and washers 135. It is contemplated that other removeable fastening means may be employed as well. A pair of conductive paths 125, such as wires, may be used to provide electrical connectivity between the solar cell 115 and the electrodes 110.

In operation a safe low voltage DC current is applied to the copper electrodes generated as a result of sunlight incident on the solar cell 115. As the ions attempt to move from one electrode to the other, many of them become suspended in the water. Copper ions have the ability to pierce the protective outer membrane of a cell and disrupt enzyme balance thereby killing algae.

Figure 3:
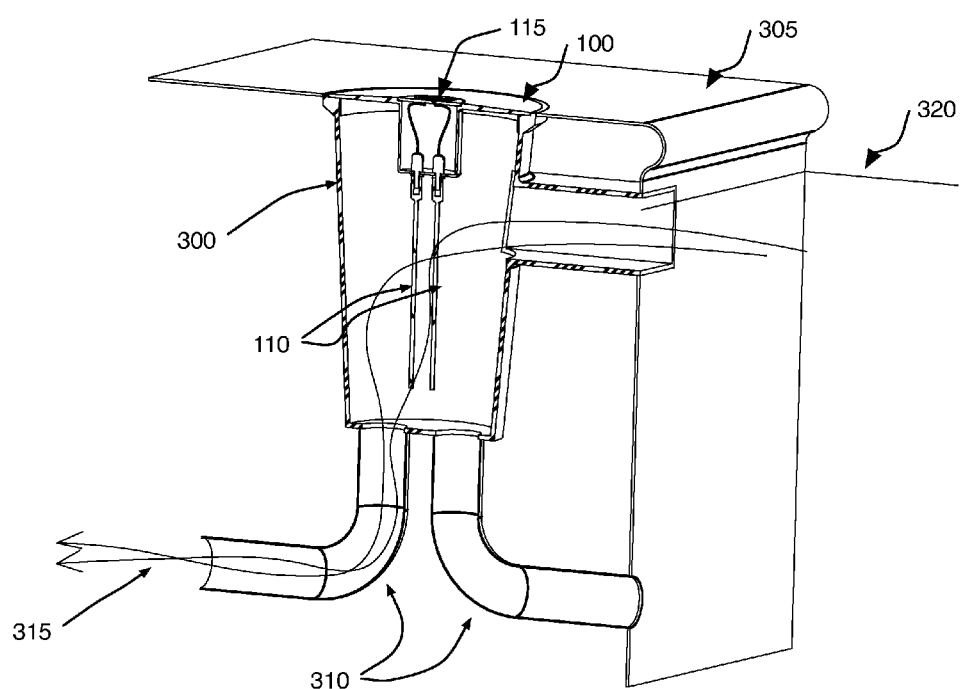
FIG. 3 is an illustration showing a solar-powered skimmer installed in the water circulation system of a typical swimming pool.

Referring now to FIG. 3, a cross-section of a pool skimmer 300 is shown, installed as is known in the art. Typically, the skimmer 300 is installed below poolside surface 305. Water flows through the skimmer 300 through a series of pipes 310 as indicated by the flow lines 315. The water level of the pool is indicated as surface level 320.

The solar-powered skimmer 100 including the solar cell 115 and electrodes 110 is shown as being installed on the skimmer 300 and generally flush with the surface 305. The electrodes 110 are shown as being extended in a downward direction below the surface level 320 of the pool water.

In a preferred embodiment, substantially all of the water contained in a pool is draw through the electrodes 110 of the apparatus 100 through the skimmer system in which the apparatus 100 is installed. In addition to the mechanical filtering effects of the skimmer system, the water drawn through the electrodes 110 may be ionized or purified. It is contemplated that a pool owner may not need traditional chemicals other than a PH leveler.

Figure 4A:
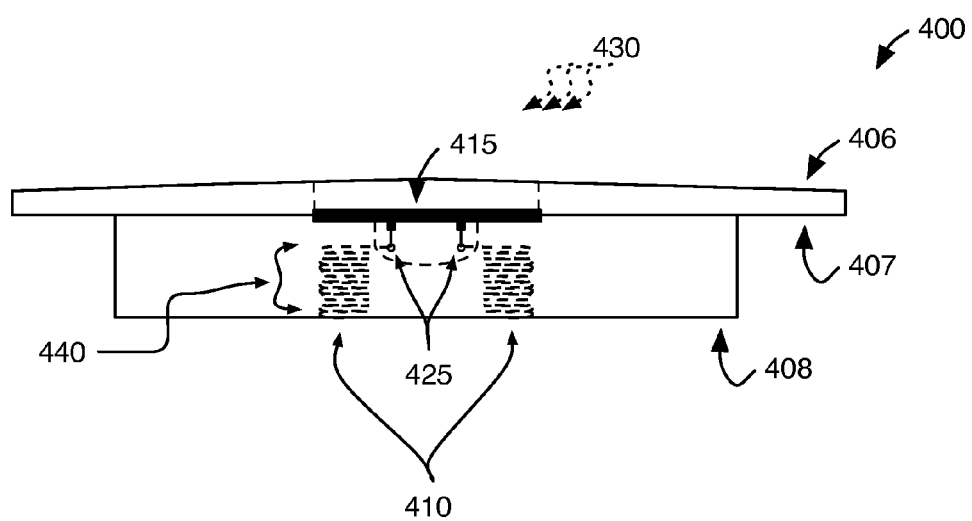
FIGS. 4A-4B are side views showing a solar-powered skimmer having a pair of extendable electrodes in retracted and extended positions.
Figure 4B:
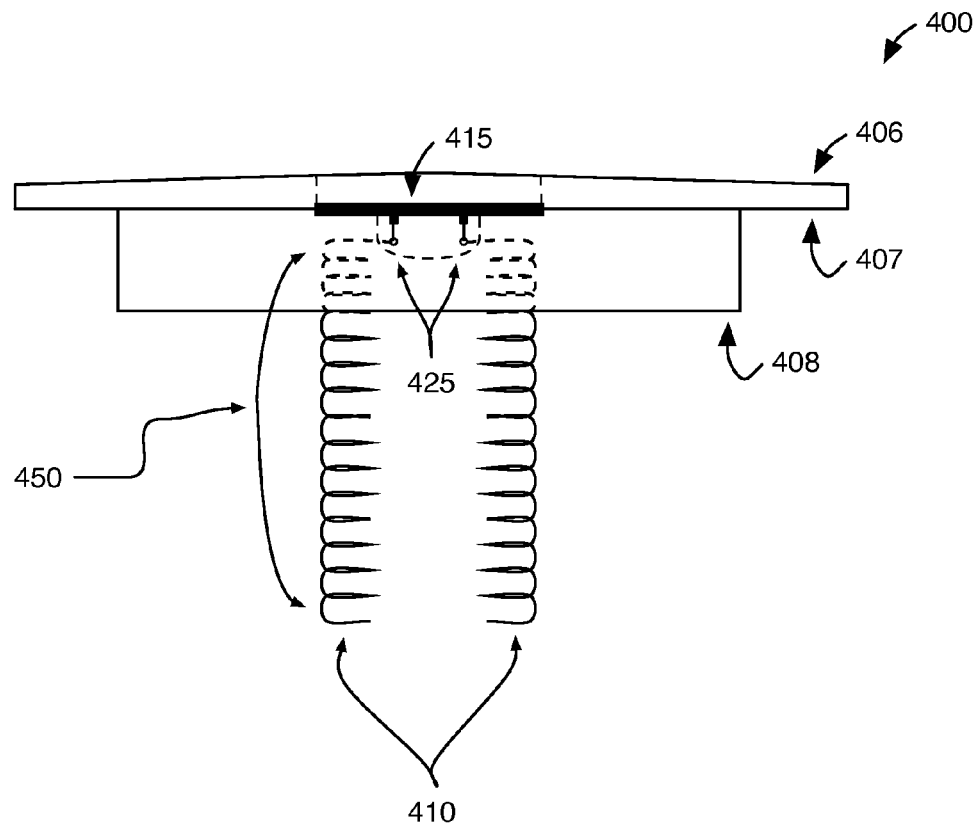

FIGS. 4A-4B are side views of another embodiment of a solar-power pool skimmer lid apparatus 400 in accordance with the teachings of this disclosure. The apparatus 400 includes a lid 405 having a top surface 406 and a bottom surface 407. The lid 405 is generally formed to retrofit into skimmer access holes found in a typical swimming pool. The lid 405 may also include a cylindrical sleeve 408 formed to fit into an existing skimmer access hole. Thus, the lid 405 is generally round in shape, but can be formed in other shapes as desired.

Within the lid 105, a solar cell 415 is disposed. The solar cell 415 is preferably oriented such that the solar cell collection is aligned proximate to the upper surface 406 of the lid 405 so as to receive incident sunlight energy 430. In a preferred embodiment, the solar cell may comprise a 3V, 70 mA solar cell. Other solar cells may be used having different output voltages and/or current ratings.

The solar cell 415 preferably includes a pair of terminals 425 representing the positive and negative terminals of the solar cell 415. A voltage is produced when sunlight is incident on the solar cell 415 and may be sensed between terminals 425 when the solar cell 415 is operative and producing energy.

The apparatus 400 also includes a pair of extendable electrodes 410. The electrodes 410 include a terminated end attached to the terminal 425 and a free end. The terminated end of each of the extendable electrodes 410 is electrically coupled to a corresponding terminal 425 such that electrical energy generated by the solar cell 415 is electrically conducted through the extendable electrodes 410. The terminated end of the extendable electrodes 410 may be removeably attached to the terminals 425 so as to be replaced by an end user.

It is contemplated that the extendable electrodes 410 may be formed in such a fashion so as to be extendable from a retracted position 440 to an extended position 450. In such a manner, the apparatus 400 may be packaged and shipped with the electrodes 410 retracted and stored within the sleeve 408. When unpackaged by the purchaser, the electrodes 410 may then be converted to the extended position 450. The extendable electrodes 410 may be extended to a desired length such that the lower end of the electrodes 410 makes electrical contact with the water flowing through the skimmer as shown in FIG. 3.

It is contemplated that the electrodes 410 may be formed from a conductive material that is capable of being extended from a retracted state 440 to an extended state 450. In one preferred embodiment, the electrodes 410 are formed from 16-gauge stainless steel wire that has be formed into a helical coil, spring-like configuration. The apparatus 400 may be shipped with the electrodes 410 tightly coiled in the retracted position 440 with the electrodes contained entirely within the sleeve 408 of the apparatus 400. To install the apparatus 400, the user may simply pull on the free end of the electrodes to uncoil the electrodes 410 to a desired extended position 450. In preferred embodiments, the electrodes 410 may be extended approximately 16 inches downward from the bottom surface 407.

Though the electrodes 410 are shown as being form in a coil fashion, it is to be understood that any flexible and conductive configuration may be employed such that the electrodes 410 may be stored in a retracted position 440, and shifted to an extended position 450 for installation and operation. The extending of the electrodes from the retracted position to the extended position is preferably accomplished without any further assembly or the use of tools.

The invention claimed is:

1. A solar-powered pool skimmer lid apparatus for purifying water, consisting of:
   a lid having an upper surface and a lower surface;
   a cylindrical sleeve extending from said lower surface;
   a solar cell affixed to said upper surface of said lid, said solar cell having electrical power available at a pair of terminals responsive to said solar cell receiving incident light;
   a pair of stainless steel electrodes, each of said stainless steel electrodes having a free end and a terminated end, said terminated end electrically affixed to said terminals of said solar cell;
   said pair of stainless steel electrodes capable of being stored in a retracted position proximate said lower surface of said lid within said cylindrical sleeve and moved to a spaced-apart and downward extended position.

2. The solar-powered pool skimmer lid apparatus of claim 1, wherein said single solar cell consists essentially of a 3V, 70 mA solar cell.

3. The solar-powered pool skimmer lid apparatus of claim 2, wherein said pair of stainless steel electrodes are substantially parallel when moved to said spaced-apart and extended position.

4. The solar-power pool skimmer lid apparatus of claim 1, wherein said lid is adapted to be installed in a pool-side skimmer access hole, and said free ends of said stainless steel electrodes are capable of being extended to a position below said surface of pool water being drawn through said skimmer.

\* \* \* \* \*